(No Model.)
W. T. COOK.
SNOW PLOW.
No. 596,740.            Patented Jan. 4, 1898.
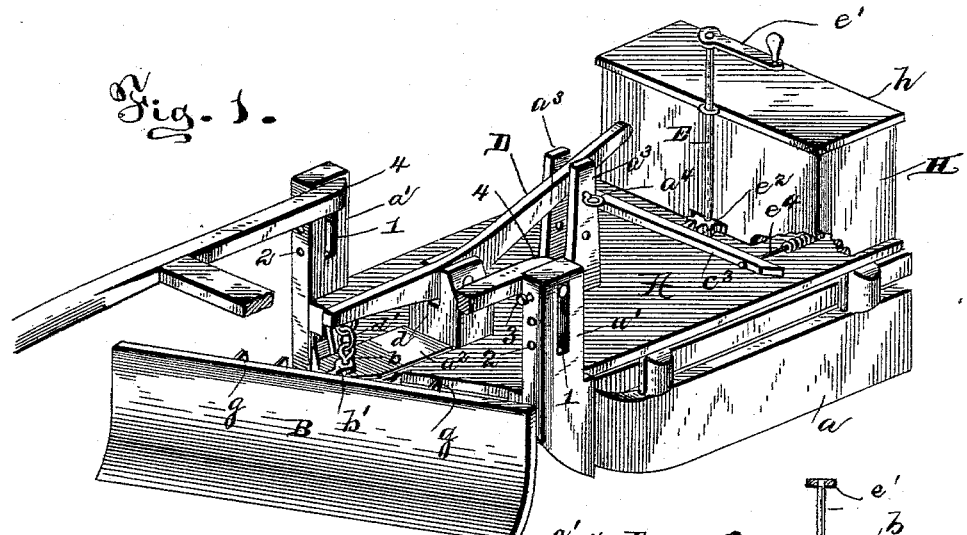
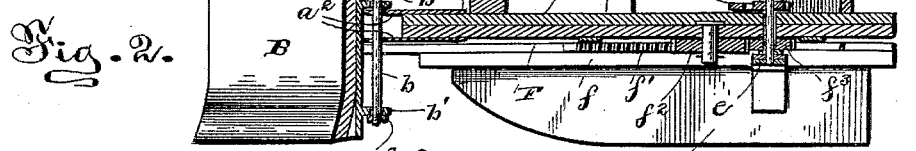
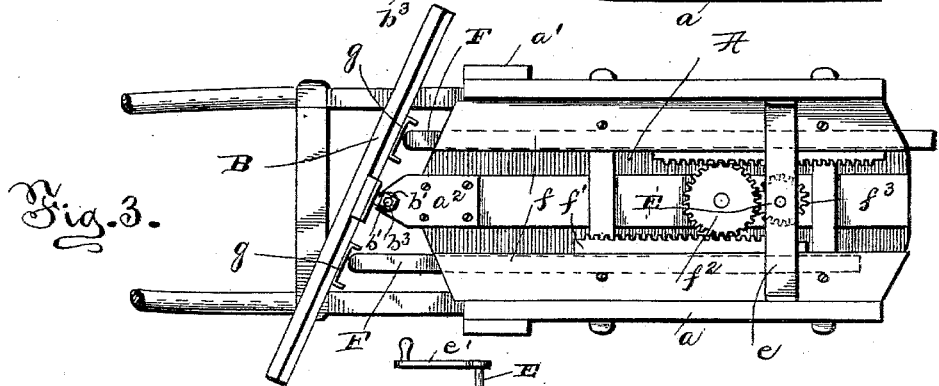
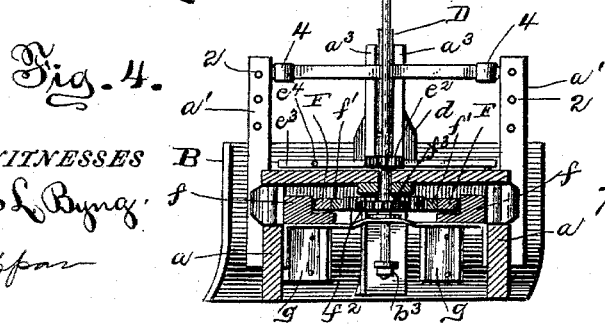
WITNESSES
Marcus L. Byng.
J. C. Tappan
INVENTOR.
Walter T. Cook.
by John Wedderburn
Attorney

UNITED STATES PATENT OFFICE.

WALTER T. COOK, OF BLUE HILL, MASSACHUSETTS.

SNOW-PLOW.

SPECIFICATION forming part of Letters Patent No. 596,740, dated January 4, 1898.

Application filed September 11, 1896. Serial No. 605,499. (No model.)

*To all whom it may concern:*

Be it known that I, WALTER T. COOK, a citizen of the United States, residing at Blue Hill, in the county of Norfolk and State of Massachusetts, have invented certain new and useful Improvements in Snow-Plows; and I do hereby declare the following to be a full, clear, and exact description of the invention, such as will enable others skilled in the art to which it appertains to make and use the same.

This invention relates to improvements in snow plows or scrapers, and has more particular relation to such plows in which the scraper is adjustable, so that the plow may be made to scrape either to the right or to the left at the will of the operator.

The invention consists of certain novel constructions, combinations, and arrangements of parts, all of which will be hereinafter more particularly set forth and claimed.

In the accompanying drawings, forming part of this specification, Figure 1 represents a perspective view of the plow embodying my invention, a portion of the seat-box being broken away to expose the spring connected to the foot-pawl hereinafter described. Fig. 2 represents a central vertical longitudinal section through the same. Fig. 3 represents a bottom plan view of my said invention, and Fig. 4 represents a transverse vertical section through my improved plow.

A in the drawings represents the frame of the plow; B, the scraper pivotally mounted thereon; C, the shafts connected to the said frame; D, the operating-lever for raising and lowering the scraper, and E the operating-shaft for shifting the scraper from right to left.

The frame A is provided with the usual runners $a$ and has attached thereto at its forward end two upright standards $a'$, having slots 1. A series of openings 2 are made through the uprights transversely to these slots to receive pins 3. The shafts C have outwardly-bent ends 4 to enter the slots 1, and these ends 4 are held in position by said pins 3. In this way the shafts can be raised or lowered at will to suit the conditions, and thus make the hauling easier for the horse. Said shafts when in their normal position lie in a plane higher than that occupied by the scraper B when in any of its adjusted positions, whereby free movement of said scraper is permitted without interference from the shafts. Said scraper B is preferably curved vertically to approximate a scoop construction and is hung or supported upon the frame by the pivoted lever D. This lever D is pivoted on the supporting-block $d$ and is connected at its forward end by means of a link $d'$ to a vertical pin $b$, attached to the rear of the scraper by a casting $b'$, provided with eyes $b^2$, in which said pin is secured by means of a nut $b^3$. The said pin $b$ is guided in its vertical movements by apertured lugs $a^2$ $a^2$, secured to the frame A. The rear or handle end of the lever D is adapted to reciprocate between the two upright standards $a^3$ $a^3$, mounted upon the frame A. These standards are each provided with a series of horizontal apertures, through which a restraining-pin $a^4$ is adapted to be passed to hold the said lever D in any of its adjusted positions.

It will be observed from the above that the vertical adjustment of the scraper B is fully under the control of the operator and can be effected to the degree desired by the simple operation of raising or lowering the said lever D. The link connection of the said lever D with the scraper is such that the latter may readily turn from side to side without interference. This turning of the scraper so as to incline to either the right or the left, according to the direction in which it is desired to scrape, is effected by longitudinal slide-bars F F, mounted in guides $f$ $f$ of frame A and provided each with a rack-bar $f'$, said rack-bars being so situated that the teeth of the same extend toward each other. These rack-bars are adapted to be actuated by a gear or spur wheel $f^2$, horizontally mounted upon the under side of the frame A, so as to mesh with both of the said racks $f'$. This spur-wheel $f^2$ meshes with a smaller spur-wheel $f^3$, fast upon the vertical shaft E. This shaft E has its lower end seated in a transverse casting $e$, attached to the under side of the frame, and is provided at its upper end with an operating crank-handle $e'$. The rotation of the shaft E will cause the spur-wheel $f^2$ to rotate also, and thus move the racks engaging the same either back or forth, according to the direction of rotation, one rack moving forward as the other moves rearwardly and to an equal degree.

It will be observed from the above that the bars F F will be moved back and forth as said racks move and will thus turn the scraper from side to side because of their connection therewith. This connection of the forward ends of said bars with the rear of the scraper is effected by means of vertical flanged plates $g\ g$, attached to the said scraper. When the said bars F are actuated, the bar moving forward engages one of the flanges of its respective plate $g$, and thus pushes this side of the scraper forward, while at the same time the opposite bar F is receding, thus allowing the opposite side of the scraper to move rearwardly. It thus only requires the revolution of the shaft D, controlled by the operator, to effect the instant adjustment of the scraper, so that it will work to either the right or the left. The said vertical shaft E is provided with a ratchet-wheel $e^2$, that is adapted to be engaged by a pawl-bar $e^3$, pivoted on one side of the frame and contacting with said ratchet-wheel by means of a coiled spring located within a box-seat H and connected to said pawl by means of a rod of wire $e^4$. By means of this pawl shaft D is held firmly in any of its adjusted positions, but can be instantly released for adjustment by the disengagement of the pawl from said ratchet-wheel by the foot of the operator. The box-seat H is preferably located directly behind the shaft E, so that the operator may be in the best position to grasp the several operating-handles. This box-seat H is provided with a cover $h$, so that salt or any other snow-melting material or tools may be stored therein.

With my improved snow-plow the scraper is fully under the control of the operator and may be instantly adjusted to scrape either to the right or to the left and to any depth desired without stopping the plow or loosening screws, bolts, or the like.

The flanged plates upon the back of the scraper permit of the latter rising and falling without in any way interfering with the operating communication that the slide-bars have with said scraper, as the bars can engage any portion of the flanges of said plates and operate said scraper with equal facility.

Having thus described my invention, what I claim as new, and desire to secure by Letters Patent, is—

1. In a snow plow or scraper, the combination with a suitable frame, of a scraper provided with a vertical pin, apertured lugs on said frame in which said pin is mounted, a pivoted lever connected to said pin for raising and lowering the scraper, slide-bars adapted to engage said scraper to incline it either to the right or to the left, and means for operating said bars, substantially as described.

2. In a snow-plow, the combination with a suitable frame, a scraper, a vertical pin mounted on said scraper, apertured lugs attached to the frame and adapted to guide said pin, a pivoted lever connected to said pin for raising and lowering the scraper, flanged plates attached to the scraper, slide-bars mounted on the frame and adapted to engage said flanged plates to incline the scraper either to the right or to the left, rack-bars mounted on said slide-bars, gearing for operating said rack-bars to move one of the slide-bars forward as the other moves rearwardly, and means for operating said gearing, substantially as described.

3. In a snow plow or scraper, the combination with a suitable frame, of a scraper provided with a vertical pin, apertured lugs on said frame in which said pin is mounted, and a pivoted lever connected to said pin for raising and lowering the scraper, substantially as described.

4. In a snow-plow, the combination with a suitable frame, of a scraper pivotally mounted thereon and capable of vertical movement, double flanged plates mounted on said scraper, means for adjusting the scraper vertically, slide-bars mounted in said frame and adapted to engage said flanged plates so as to operate the scraper but at the same time permit vertical movement of the same, and means for actuating said bars, substantially as described.

5. In a snow-plow, the combination with a suitable frame, of a scraper pivotally mounted thereon, double flanged plates mounted upon each side of the pivot-point of said scraper, means for moving said scraper vertically, sliding rack-bars adapted to engage the flanged plates to move the same but at the same time permit of the vertical movement of said scraper, and a toothed wheel adapted to engage said rack-bars so as to force one forward as the other is retracted, substantially as described.

6. In a snow-plow, the combination with a suitable frame, of upright slotted standards mounted thereon, shafts having pins mounted in the slots of said standards and independent pins for securing said shaft-pin in any desired position in said slots, substantially as described.

In testimony whereof I have signed this specification in the presence of two subscribing witnesses.

WALTER T. COOK.

Witnesses:
W. H. HAMMOND,
J. A. COUDY.